United States Patent [19]

Gerber

[11] 4,363,539
[45] Dec. 14, 1982

[54] PHOTOHEAD WITH FLASHING BEAM

[75] Inventor: Heinz J. Gerber, West Hartford, Conn.

[73] Assignee: Gerber Scientific, Inc., South Windsor, Conn.

[21] Appl. No.: 284,780

[22] Filed: Jul. 20, 1981

[51] Int. Cl.³ ............................................ G03B 41/00
[52] U.S. Cl. ......................................................... 354/4
[58] Field of Search .................. 354/4, 5; 346/108; 350/6.8; 355/32

[56] References Cited

U.S. PATENT DOCUMENTS

| Re. 27,265 | 1/1972 | Ritchie et al. | 354/4 |
| 3,330,182 | 7/1967 | Gerber et al. | 354/4 |
| 3,565,524 | 2/1971 | Pabst et al. | 354/4 |
| 3,648,578 | 3/1972 | Ritchie et al. | 354/4 |
| 3,695,154 | 10/1972 | Webster | 354/4 |
| 3,903,527 | 9/1975 | Frehling | 354/4 |
| 4,170,745 | 10/1979 | Rich et al. | 354/4 X |

Primary Examiner—L. T. Hix
Assistant Examiner—Alan Mathews
Attorney, Agent, or Firm—McCormick, Paulding & Huber

[57] ABSTRACT

A photoplotter for use in exposing graphics or artworks on a photosensitive surface by directing a small beam of light onto the surface and moving it relative thereto has an output beam which is repetitively flashed as it is moved over the surface to expose a line. The flashing light beam is produced by intercepting a stationary beam with a cyclically moving mirror to periodically sweep it across a light accepting window, the light energy received by which is directed to the photosensitive surface. The cross-sectional size of the output light beam may be varied to vary the size of the light spot which it creates on the photosensitive surface and to therefore vary the width of the exposed line, and changes in the character of the output beam may be made in accordance with changes in the size of the spot and with changes in its speed relative to the photosensitive surface in order to obtain a desired exposure of all portions of the exposed lines. The photohead may also be designed to deliver a beam of selectively variable color to the photosensitive surface for exposing colored graphics on a color sensitive surface, and two or more beams may be combined into the single delivered output beam to produce a beam of desired color or intensity.

38 Claims, 11 Drawing Figures

PHOTOHEAD WITH FLASHING BEAM

BACKGROUND OF THE INVENTION

This invention relates to photoplotters for exposing graphics on a photosensitive surface through the use of a movable beam of light so that only a small, discrete portion of the surface is exposed at any instant of time, and deals more particularly with such a photoplotter wherein the output beam flashes as it is moved to expose a line on the surface.

Photoplotters of the general type with which this invention is concerned are shown by U.S. Pat. No. 3,330,182; No. Re. 27,265; and No. 3,565,524. Photoplotters with flashing output beams are also known in the art and are shown, for example, by U.S. Pat. No. 3,903,527 and No. 4,170,745.

The general object of this invention is to provide an improved photohead of the type having a flashing output beam for use in exposing lines.

Other more particular objects of the invention are to provide a photohead having a simple, reliable means for producing a flashing output beam and including a constantly on, non-flashing light source such as an incandescent lamp, arc lamp or laser; wherein the duration and intensity of the beam during each flash may be readily controlled; wherein the photohead may be made of low mass so as to have a low inertia facilitating rapid acceleration and deceleration; wherein the photohead may be used to project differently colored beams of light for exposing differently colored lines on a color sensitive photosensitive surface; and wherein two or more beams from different light sources may be combined in the output beam to vary the intensity or color of that beam.

Still other objects of the invention are to provide a photohead of the foregoing character which may include a means for varying the size and shape of the light spot delivered to the photosensitive surface, and which may also include a beam rotating means to cause the light spot created on the photosensitive surface to maintain a desired orientation with respect to its path of motion relative to the photosensitive surface.

Other objects and advantages of the invention will be apparent from the following description and from the accompanying drawings describing and illustrating several embodiments of the invention.

SUMMARY OF THE INVENTION

The invention concerns a means for producing a flashing output beam of light from a photohead movable relative to a sheet of photosensitive material for exposing lines on such material, and resides in such means being comprised of a light beam generator for producing a beam of light, a means providing a light accepting window, a means for periodically sweeping the beam across the light accepting window, and a means for directing light which enters the window onto the photosensitive surface.

The invention also concerns various detailed ways and means for implementing the broad conception, and as to this resides in the light accepting window being either a light transmitting aperture in either a thin or thick aperture member or the input end surface of a light conductor, in the beam sweep means being either a rotating mirror or an oscillating mirror, in the beam sweep means being usable with a number of different light sources, and in the light source possibly being located in a stationary housing remote from the photohead with light being conducted from the stationary housing to the photohead through a flexible light conductor.

The invention also resides in other details as stated in the claims.

DESCRIPTION OF THE PREFERRED EMBODIMENTS

The drawings show a number of different embodiments of the invention. In these showings parts of a later described embodiment or embodiments which are identical or similar to corresponding parts of a previously described embodiment are usually given the same reference numbers as in the previously described embodiment and redescription of them in discussing the later embodiment or embodiments is usually unnecessary to the understanding of the latter embodiment or embodiments and is therefore usually omitted.

Figure 1:
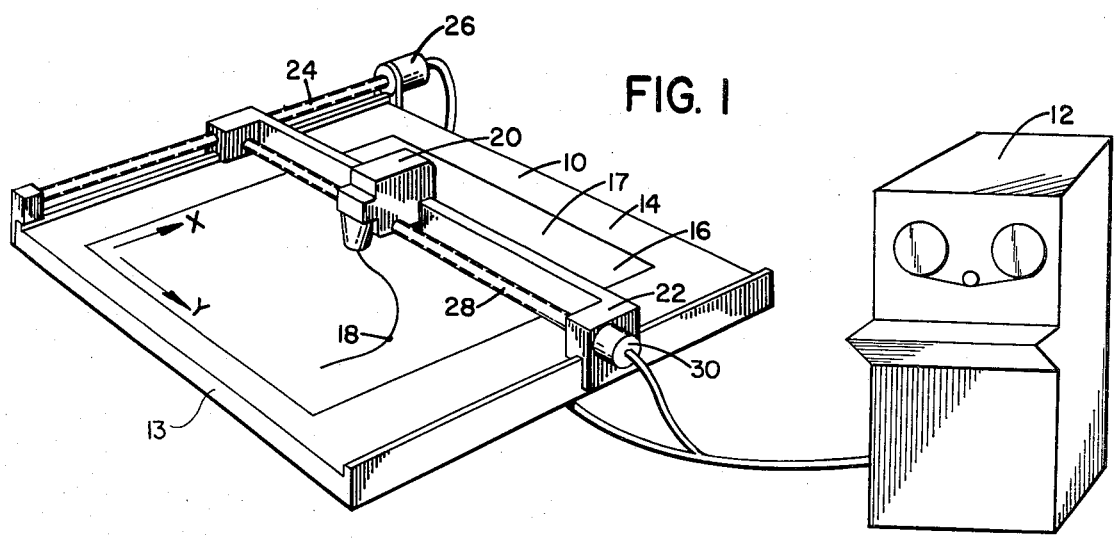
FIG. 1 is a perspective view showing a plotting system having a photohead embodying this invention.

FIG. 1 shows a photoplotting system consisting of an X-Y plotter or positioning mechanism 10 and an associated controller 12. The plotter 10 has a stationary table 13 with a support surface 14 for holding a piece of film, glass or other material 16 providing an upwardly facing photosensitive surface 17 on which lines are to be exposed, one such line being shown, for example, at 18. A photohead 20 is supported for movement above the supporting surface 14 in a plane parallel thereto by a carriage 22 straddling the table and movable in the X coordinate direction by a lead screw 24 driven by an associated motor 26. The photoplotter 20 is in turn attached to or part of a subcarriage movable in the illustrated Y coordinate direction relative to the main carriage 22 and is driven in such movement by a lead screw 28 powered by an associated motor 30. The drive motors 26 and 30 are energized by appropriate signals from the controller 12 to cause the photohead 20 to be driven simultaneously in the X and Y coordinate directions so as to follow any desired line on the photosensitive surface 17. The controller 12 also supplies other signals to the photohead 20 for controlling its operation as hereinafter described.

Figure 2:
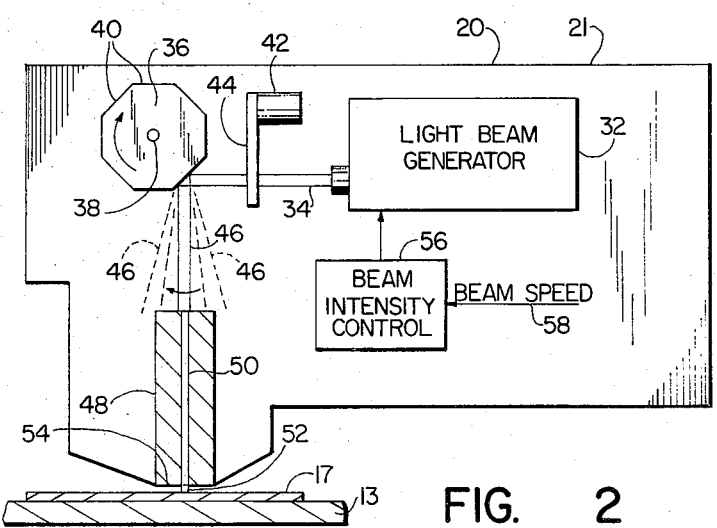
FIG. 2 is a schematic diagram illustrating the photohead of FIG. 1.

The photohead 20 of FIG. 1 is shown in more detail in FIG. 2. It comprises a housing 21 containing a light beam generator 32 for producing a stationary light beam 34 preferably of relatively well collimated form. This stationary beam is intercepted by a rotating mirror 36. The mirror 36 is driven in rotation about its axis 38 by a suitable motor (not shown) in the direction of the arrow and has a number of flat faces 40, 40. The number of these faces may vary without departing from the invention, and in the illustrated case the mirror 36 has eight such faces 40, 40. A shutter mechanism 42 has a blade 44 movable between blocking and non-blocking positions relative to the beam 34 to either prevent or permit the beam 34 reaching the mirror 36.

With the shutter in its unblocking position and with the mirror 36 rotating a reflected beam 46 is produced which is swept from right to left, as shown by the broken lines and arrow in FIG. 2, as each mirror flat 40 moves past the stationary beam 34, and the repetitive movement of the several flats in succession past the beam 34 therefore causes the reflected beam 46 to have a periodic swinging or sweeping movement over a given sweep path.

In accordance with the invention, a means providing a light accepting window is positioned in the sweep path of the reflected beam 46 so that throughout part of its movement the beam is aligned with the window, so as to inject light energy into the window, and throughout another position of its movement is out of alignment with the window so as not to inject light energy into the window. The window therefore receives light energy in time spaced intervals or flashes, and some or all of the light energy so received by the window is used to form the output beam of the photoplotter 20 which is delivered to the photosensitive surface 17 and which has a corresponding on and off flashing character. It is also within the invention that the sweeping movement of the reflected beam 46 may be so small relative to the size of the window that the beam never entirely moves from the light accepting window and instead moves between positions at which more and less of the beam is captured by the window, the flashing output therefore not being strict "on and off" flashing of the output beam between one state of high light energy and a second state of no light energy but instead an "on and less on" flashing of the output beam between one state of high light energy and a second state of lesser light energy.

In the photoplotter 20 of FIG. 2 the means providing the light accepting window is a thick aperture member, such as a pipe 48, having an aperture 50 passing therethrough along a straight line. The aperture 50 is of circular cross section and has a length which is many times longer than its cross sectional diameter. Accordingly, the output light beam, indicated at 52, is very well collimated and very little spreading of the output beam 52 occurs in its passage from the exit end 54 of the aperture member 48 to the photosensitive surface 17. Nevertheless, to minimize the spreading effect of whatever divergence may still remain in the output beam 52 the exit end 54 of the aperture member is preferably located relatively close to the photosensitive surface 17, as shown in FIG. 2.

The light beam generator 32 of the photohead 20 may be any one of many well-known devices using a light source and lenses or other optical components for producing the stationary beam 34; and the light source used by the generator, may, for example, be an incandescent lamp, arc lamp or laser capable of continuous operation. Preferably, the light beam 34 produced by the light beam generator 32 is one having a relatively high maximum intensity so that the flashes of the output beam 52 may also have relatively high maximum intensities. Also, the photoplotter 20 preferably includes a beam intensity control 56 which adjusts the intensity of the light beam 34 in accordance with the speed of the output beam 52 relative to the photosensitive surface 17, as represented by a beam speed signal supplied to the control 56 on line 58, with the intensity being increased with increases in the speed. It will also be understood that the mirror 36 is rotated at such a speed relative to the speed of movement of the beam along the line to be exposed that the spot illuminated on the photosensitive surface 17 by each flash of the output beam 52 overlaps a substantial portion of the spot illuminated by the preceding flash so that as a consequence of the repeated flashes a continuous line is exposed.

Figure 3:
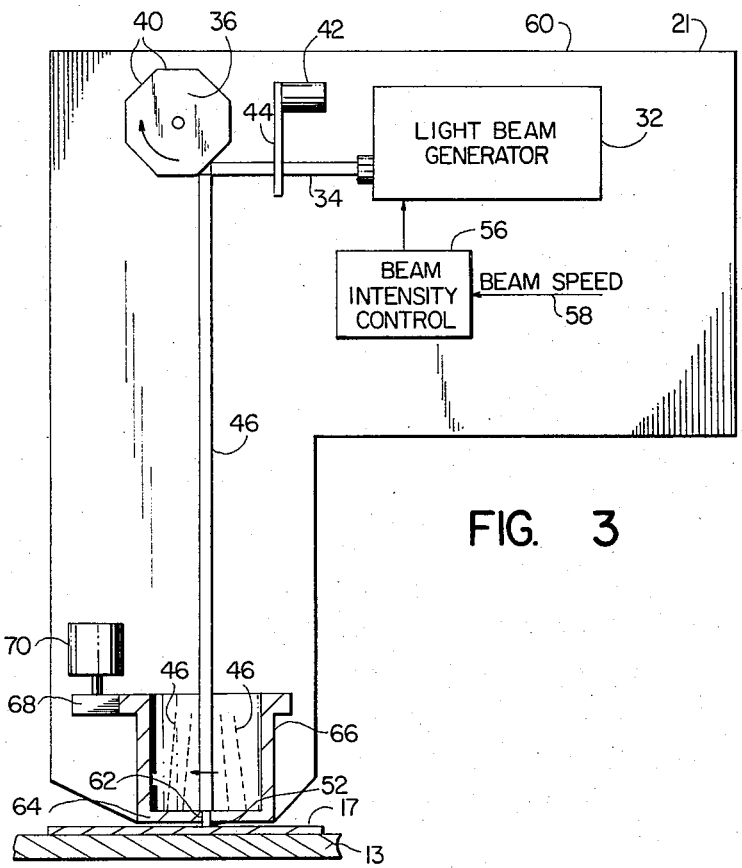
FIG. 3 is a schematic diagram illustrating a photohead usable in the system of FIG. 1 and comprising another embodiment of the invention.

FIG. 3 shows another photohead 60 embodying the invention and which may be used in place of the photohead 20 of FIG. 1. Referring to FIG. 3, the photohead 60 is generally similar to the photohead 20 of FIG. 2 except for having a different type of aperture means. The aperture is indicated at 62 and is contained in a relatively thin aperture plate 64 so as to have a small aperture length (longitudinally of the beam 46) to nominal aperture cross sectional size ratio. Also, the aperture plate 64 is located a relatively long distance from the mirror 36 so that all of the light rays of the reflected beam 46 which enter the aperture 62 are at a relatively small angle to the axis of the aperture 62, making the divergence of the output beam 52 quite small. Also, the aperture plate 64 is located directly adjacent and quite close to the photosensitive surface 17 so as to minimize the spreading effect of whatever divergence the beam 52 may have, and allowing the light energy passing from the aperture 62 to be used to directly expose the photosensitive surface 17 without an intervening projection lens. The aperture plate 64 may be fixed relative to the housing 21, in which case the aperture 62 is preferably of circular cross section. However, as an alternative to this FIG. 3 shows the aperture plate 64 as part of a member 66 which is rotatable about a vertical axis and which is driven and positioned in such rotation by a gear 68 and motor 70. Therefore, the aperture 62 may be of a noncircular cross section, such as a square or rectangle, and the motor 70 may be energized through a suitable control signal from the controller 12 to maintain a given dimension or axis of the aperture cross section at a given orientation relative to the line being exposed.

Figure 4:
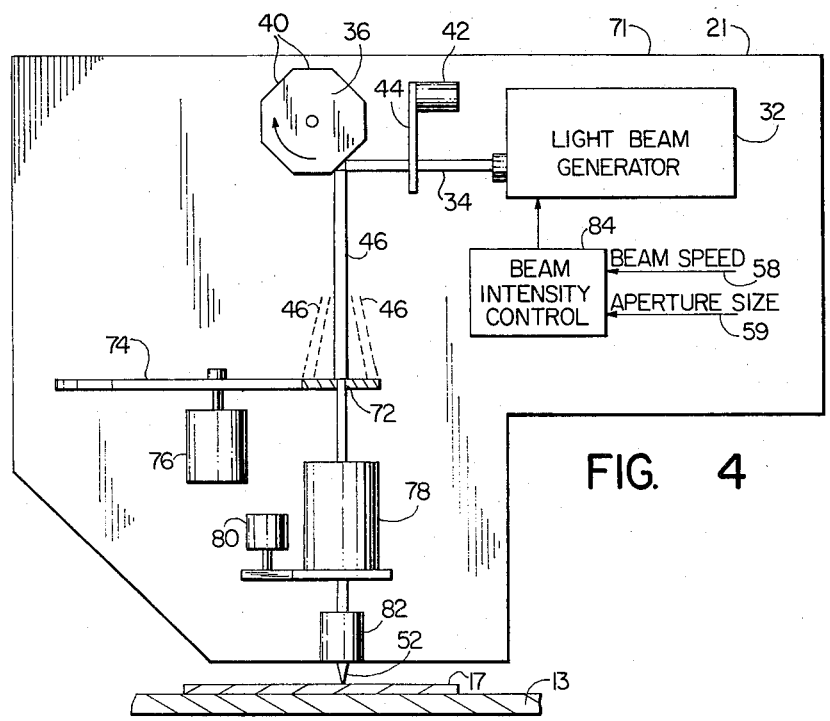
FIG. 4 is a schematic diagram illustrating a photohead usable in the system of FIG. 1 and comprising still another embodiment of the invention.

FIG. 4 shows another photohead 71 which may be substituted for the photohead 20 of FIG. 1. In this photohead the aperture, indicated at 72, across which the reflected beam 46 is swept is provided by an aperture wheel 74 having a plurality of such apertures, of different sizes and shapes, located along its marginal edge and which wheel is angularly positioned by a motor 76 so that any one of its apertures may be brought to the active position. The light energy accepted by and passing through the active or selected aperture 72 passes through a beam rotator 78, angularly positioned by a drive motor 80, and through a projection lens 82 which focuses the output beam 52 onto the photosensitive surface 17 to expose on the surface 17 an image of the aperture 72. The beam rotator 78 may be used with noncircular apertures to maintain a given dimension or axis of such aperture at a given orientation relative to the line being exposed. Also, associated with the light beam generator 32 is a beam intensity control 84 which is responsive to both a beam speed signal supplied on the line 59 and an aperture size signal supplied on the line 60 for varying the intensity of the beam 34 both in accordance with changes in the beam speed and in accordance with changes in the size of the aperture 72, with the intensity being varied directly with beam speed and inversely with aperture size.

Figure 5:
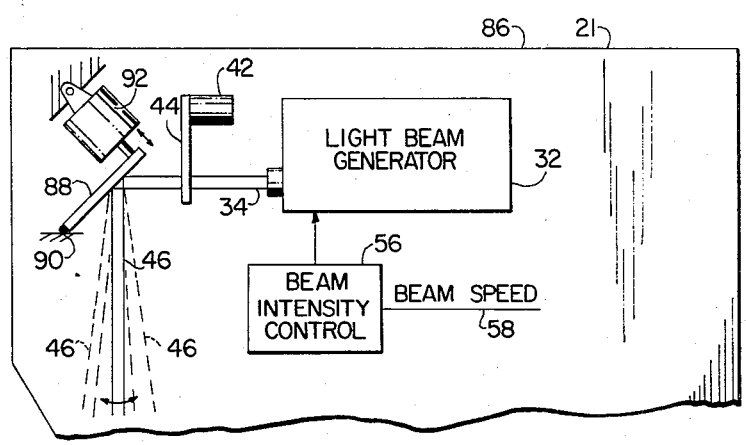
FIG. 5 is a schematic illustration of a portion of a photohead showing an alternative beam sweep means which may be used in a photohead which is otherwise such as shown in FIGS. 2, 3 and 4.

Various other means beside a rotating mirror may be used for producing a sweeping light beam for use in a photohead of this invention, and FIG. 5 shows one such alternate means. In this figure the illustrated photohead 86 uses an oscillating or dithering mirror 88 which intercepts the stationary beam 34 and produces a sweeping reflected beam 46. In this case the beam 46 sweeps back and forth in both directions, from right to left and from left to right, as indicated by the doubleheaded arrow, but nevertheless may be used in place of the sweeping beam of any of the previously described photoheads of FIG. 2, 3 or 4. The means for oscillating the mirror 88 may vary widely. In FIG. 5 it is pivotally connected to the base of the photohead 86 for movement about a pivot axis 90 and is oscillated about such axis by a piezo-electric driver 92 connected between the mirror and the base of the photohead at a point spaced from the pivot axis.

An advantage of an oscillating or dithering mirror for producing the swinging beam is that the amplitude and frequency of the beam motion may be readily controlled and varied to vary the character of the output beam 52. For example, by increasing the mirror oscillation frequency while decreasing its amplitude the number of flashes per second may be increased while keeping the light energy content of the flashes substantially unchanged. Thus, in the exposure of a line, at the beginning of the line during which period the photohead moves relatively slowly while accelerating to top speed, the oscillating mirror may be oscillated to produce output beam flashes at a relatively low frequency and/or at relatively low intensities and as the speed of the photohead increases the oscillation of the mirror may be changed to produce output flashes at increased frequency and/or increased intensity, and possibly when the photohead reaches top speed the oscillation of the mirror may be stopped to produce an output beam which is nonflashing and on continuously. Also, the characteristic motion of the beam throughout each cycle may be varied by varying the characteristic of the voltage waveform applied to the piezo-electric driver. That is, the voltage waveform may be sawtooth, sinusoidal, or of some other form to obtain either a linear or some non-linear motion of the beam relative to the associated aperture or other light-accepting window.

It should also be noted that as the amplitude of the oscillating mirror 88 is reduced the amplitude of the reflected beam is also reduced and will eventually reach a condition at which the beam does not, in either direction of its swing, move entirely beyond the boundary of the associated aperture or other light accepting window. When this condition exists the output beam 52 is not flashed between on and off states but instead is modulated or flashed between on and less-on states, that is between a state of maximum light energy content and a state of minimum light energy content greater than zero. Such flashing of the output beam between on and less-on states may be desirable or useful under some circumstances and, as mentioned previously, is within the purview of the invention, the term "flashing output beam" as used in the claims being intended to cover both a beam which flashes between on and off states and a beam which flashes between on and less-on states.

Figure 6:
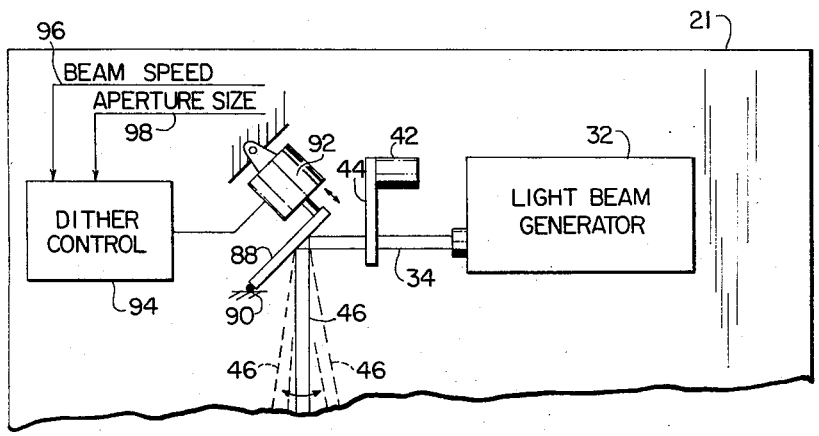
FIG. 6 is a schematic illustration of a portion of a photohead showing another alternative beam sweep means which may be used in a photohead which is otherwise such as shown in FIGS. 2, 3 and 4.

A photoplotter having means for controlling the character of oscillation of the mirror 88 is shown in FIG. 6 and includes a dither control circuit 94 for the piezo-electric driver 92 which may control either or both the frequency or amplitude of the oscillating mirror 88 by, for example, controlling either or both the frequency and amplitude of the voltage signal supplied to the driver 92. The dither control circuit 94 is responsive to control signals supplied by the main controller 12, FIG. 6 showing such signals to comprise a beam speed signal provided on the line 96 and related to the speed of the beam relative to the photosensitive surface 17 and an aperture size signal appearing on the line 98 and related to the size of the aperture, this assuming of course that the aperture is of variable size.

Figure 7:
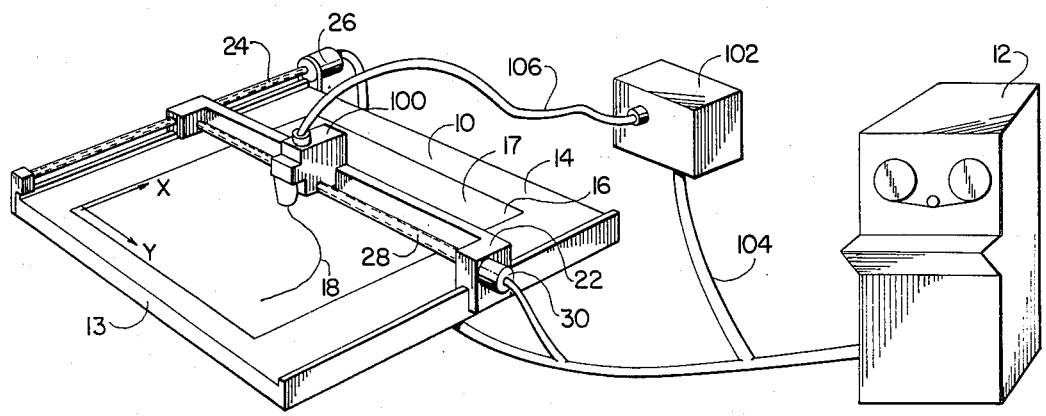
FIG. 7 is a perspective view showing a plotting system using a photohead comprising still another embodiment of this invention.

In cases, such as in the foregoing embodiments, where the photohead moves relative to a stationary table or the like which supports the photosensitive material the weight of the photohead may, if desired, be reduced to facilitate high accelerations and decelerations by placing some of its components in a remote stationary location and by conducting light from the stationary location to the moving portion by means of a flexible light conductor. Such an arrangement is shown in FIG. 7 wherein a photoplotting system has a movable photohead 100 and an associated stationary remote unit 102. The remote unit 102 receives control and energizing signals from the controller 12 over the illustrated cable 104 and light from a light source within the unit 102 is conducted from that unit to the photohead 100 over a flexible light conductor 106, which may consist of a bundle of optical fibers.

Figure 8:
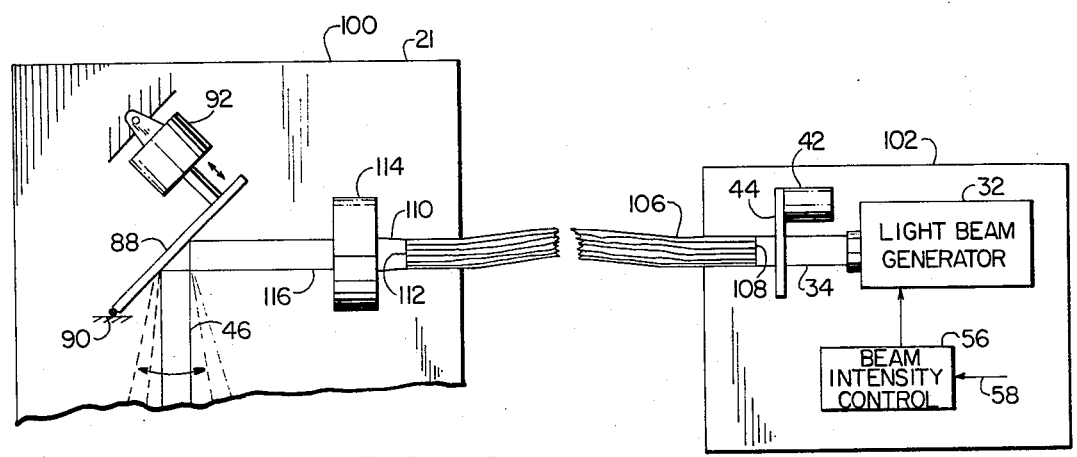
FIG. 8 is a schematic diagram showing a portion of the photohead of FIG. 7.

As shown in more detail in FIG. 8, the remote unit 102 of FIG. 7 has a light beam generator 32, beam intensity control 56 and shutter mechanism 42 similar to, for example, the photohead 20 of FIG. 2, and the stationary beam 34 of the light beam generator 32 is directed onto the input end face 108 of the light conductor 106. The light conductor 106 conducts light energy received from the beam 34 to the photohead 100, with the exit end portion of the light conductor 102 being fixed relative to the housing 21 of the photohead. The light beam 110 emerging from the exit end face 112 of the conductor is submitted to a collimating lens 114 producing a stationary collimated beam 116. This stationary beam 116 may then be converted within the photohead 100 into a swinging beam 46 and used in any of the ways previously illustrated and described for producing a flashing output beam. By way of example, the means shown in FIG. 8 for converting the stationary beam 116 to a swinging beam 46 is an oscillating mirror 88 similar to that of FIG. 5.

Figure 9:
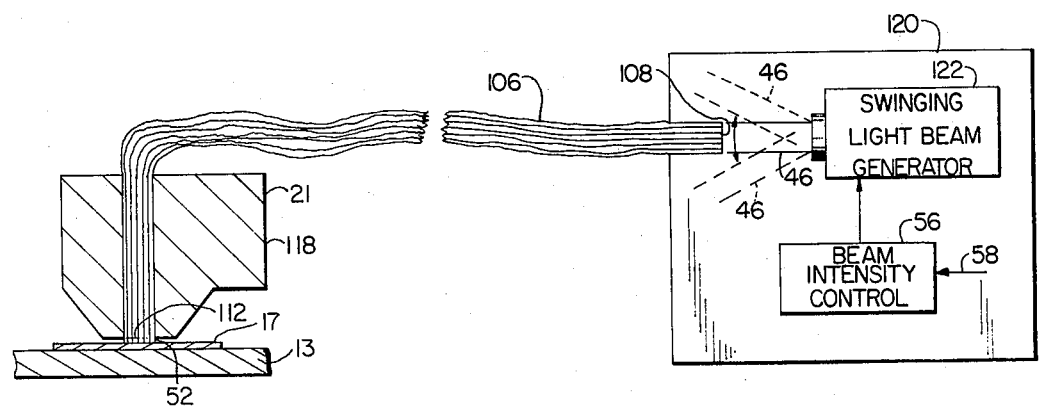
FIG. 9 is a schematic view showing a photohead comprising an alternative embodiment of the invention and which may be used in the plotting system of FIG. 7.

FIG. 9 shows another photoplotter 118 and remote stationary unit 120 which may be used in place of the photohead 110 and unit 102 of FIGS. 7 and 8. In this case the remote unit 120 has a swinging light beam generator 122 for producing a swinging light beam 46. This generator may, for example, be any one of the mechanisms shown and described in connection with FIGS. 1 to 7 for producing a swinging beam 46 and it preferably, as illustrated, includes a beam intensity control 56 for controlling the intensity of the swinging beam 46 in accordance with a signal such as a beam speed signal appearing on the input line 58. The input end face 108 of the light conductor 106 in the auxiliary unit 120 of FIG. 9 provides a light accepting window for the illustrated swinging beam 46 and therefore light energy is injected into the light conductor 106 in a flashing manner as the beam is swept across this window.

The photohead 118 associated with the remote unit 120 of FIG. 9, may be of relatively simple construction. As shown it consists basically of the housing 21 which supports the exit end 112 of the light conductor so as to be positioned adjacent to and close to the photosensitive surface 17. The light energy exiting through the exit end face 112 of the light conductor is therefore transmitted directly to the photosensitive surface 17 and constitutes the flashing output beam 52 of the photohead 118.

Although not illustrated it will also be understood in connection with FIG. 9 that instead of the light energy emerging from the exit end face 112 of the light conductor being transmitted directly to the photosensitive surface 17, the exit end face 112 could be positioned in the housing 21 so as to be spaced farther from the photosensitive surface 17 and the photohead 118 could include a projection lens between the end face 112 and the surface 17 for projecting the escaping light energy onto the surface 17. This projecting lens could be used to project onto the photosensitive surface 17 either an image of the exit end face 112, or an aperture illuminated by the light energy emerging from the exit end face 112 could be located between the end face and the projection lens and the projection lens could be used to project an image of the illuminated aperture onto the photosensitive surface.

In further accordance with the invention, a photohead embodying the invention may also have a number of different stationary beams in combination with a mirror means for selecting and/or combining the beams as well as for providing a sweeping beam motion. One such photohead 124 shown in FIG. 10 has three different light beam generators 126, 128 and 130 producing three differently colored stationary beams 132, 134 and 136. These beams are in turn directed onto or toward a single oscillating or dithering mirror 138. The mirror is supported relative to the base of the photoplotter 124 for pivotal movement about an axis 140 and is driven in such movement by a piezo-electric driver 142. The pivot axis 140 of the mirror is in turn movable relative to the base of the plotter between three different positions marked A, B and C. With the pivot axis 140 in the A position the mirror 138 has a fundamental position as shown by the associated dotted lines. It is oscillated about this fundamental position by the driver 142 and in doing so converts the red stationary beam 136 into a swinging beam 144 which is swept back and forth across and aperture 144 in an aperture plate 146. An associated projection lens 148 projects an image of the aperture 144 onto the photosensitive surface 17 as the flashing output beam 52.

Figure 10:
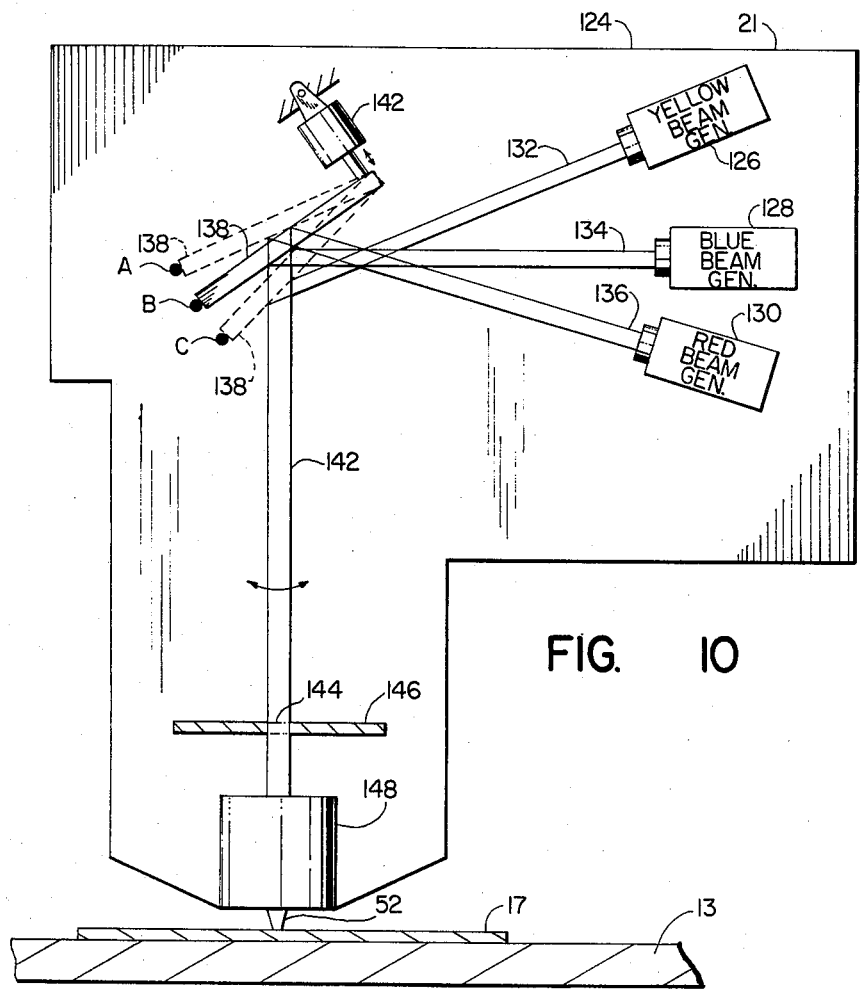
FIG. 10 is a schematic diagram illustrating a photohead comprising still another embodiment of the invention and which may be used in the plotting system of FIG. 1.

Likewise, when the pivot axis 140 of FIG. 10 is in the B position the mirror 138 is oscillated about the fundamental position shown by the associated solid lines and converts the blue beam 134 into the swinging beam 142, and when the pivot axis 140 is in the C position the yellow beam 132 is similarly converted into the swinging beam 142. If desired, all three beams 132, 134 and 136 may remain on at all times as the mirror 138 will act to convert only one of the them, depending on the position of the axis 140, into a swinging beam 142 which is swept past the aperture 144.

Figure 11:
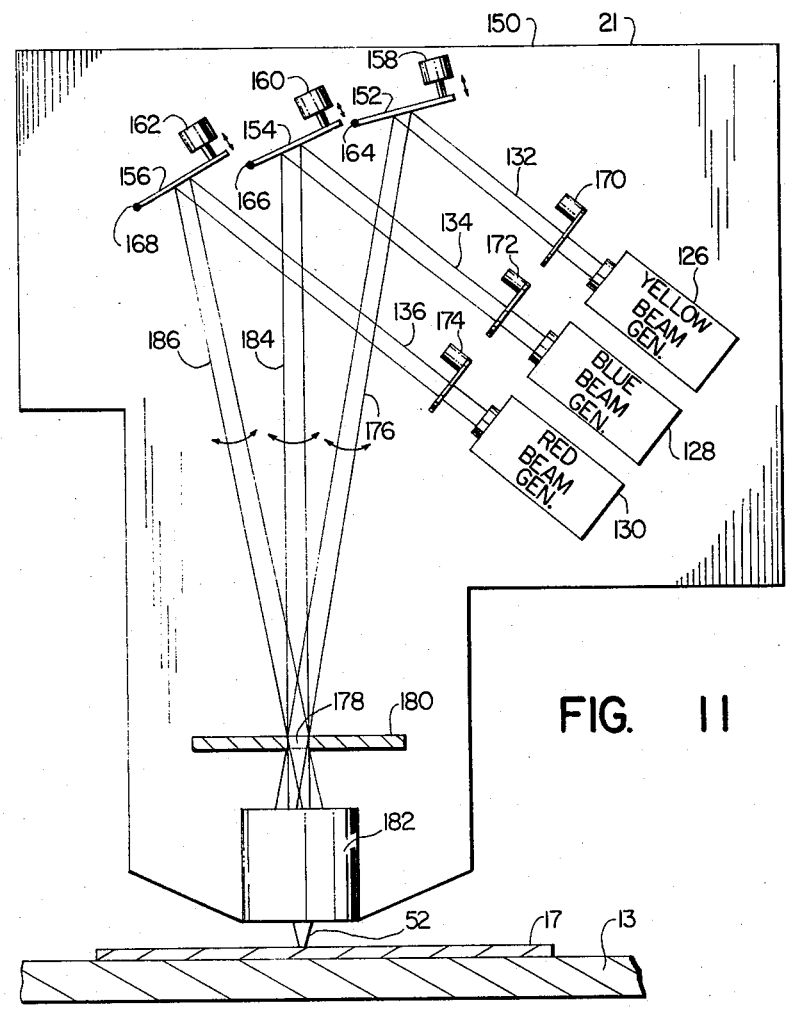
FIG. 11 is a schematic diagram illustrating a photohead comprising still another embodiment of the invention and which may be used in the plotting system of FIG. 1.

FIG. 11 shows another photohead 150 having a plurality of stationary beams. In this photohead three beam generators 126, 128 and 130 produce three differently colored stationary beams 132, 134 and 136. It also includes three separate oscillating or dithering mirrors 152, 154 and 156 each associated with a respective one of the stationary beams and each having its own piezoelectric driver 158, 160 or 162 and its own pivot axis 164, 166 or 168. Shutter mechanisms 170, 172 and 174 serve to selectively block or unblock the associated beams 132, 134 and 136. When the shutter mechanism 170 is in its unblocking condition the oscillating mirror 152 converts the stationary yellow beam 132 into a swinging beam 176 swept across an aperture 178 in an aperture plate 180, and a projection lens 182 projects an image of the aperture onto the photosensitive surface 17 as the flashing output beam 52 of the photohead. Similarly, when the shutter 172 is in its unblocking state the oscillating mirror 154 converts the stationary blue beam 134 into a swinging beam 184 similarly swept across the aperture 178, and when the shutter mechanism 174 is in its unblocking condition the red beam 136 is converted by the mirror 156 into another swinging beam 186 swept across the aperture 178. Therefore, by use of the shutter mechanisms 170, 172 and 174 any one of the three colored beams may be selected independently of the others for sweeping across the aperture 178 to produce an accordingly colored output beam 152, or any two or more of the beams 132, 134 and 136 may be selected and combined to produce an output beam 52 having still another color.

In FIG. 11 the three beam generators 126, 128 and 130 have been shown to produce differently colored beams 132, 134 and 136. This, however, need not be so in all cases and instead two or more of the generators could produce stationary beams of white light or other beams of similar character. Then, through the use of the shutter mechanisms and mirrors two or more of these beams of similar character could be combined to increase the intensity or light energy content of the output beam 52.

I claim:

1. In a photoplotter having a means for supporting a sheet of photosensitive material, a photohead for directing a beam of light onto said photosensitive surface, and a means for moving said photosensitive surface and photohead relative to one another to expose lines on said photosensitive surface, a means for producing a flashing output beam of light from said photohead, said flashing output beam producing means comprising:

a light beam generator for producing a beam of light, means providing a light accepting window, p1 means for periodically sweeping said beam across said light accepting window, and means carried by said photohead for directing light which enters said light accepting window onto said photosensitive surface as said flashing output beam.

2. In a photoplotter, the combination defined in claim 1 further characterized by said means providing a light accepting window being an aperture means providing a light transmitting aperture surrounded by an opaque area.

3. In a photoplotter, the combination defined in claim 2 further characterized by said means for directing light which enters said light accepting window onto said photosensitive surface comprising a projecting lens located on the opposite side of said aperture from said light beam generator for projecting light which passes through said aperture onto said photosensitive surface.

4. In a photoplotter, the combination defined in claim 2 further characterized by said aperture means being a relatively thin aperture plate through which said aperture passes.

5. In a photoplotter, the combination defined in claim 2 further characterized by said aperture means being a relatively thick member through which said aperture passes, said aperture having a length many times longer than its maximum cross-sectional dimension.

6. In a photoplotter, the combination defined in claim 4 further characterized by said means for directing light which enters said light accepting window onto said photosensitive surface being means locating said aperture plate directly adjacent and close to said photosensitive surface.

7. In a photoplotter, the combination defined in claim 5 further characterized by said means for directing light which enters said light accepting window onto said photosensitive surface comprising means locating said thick aperture containing member so that the exit end of said aperture is located directly adjacent and close to said photosensitive surface.

8. In a photoplotter, the combination defined in claim 1 further characterized by said means providing a light accepting window being an elongated light conductor having an input end surface and an output end surface, said input end surface of said light conductor being said light accepting window across which said beam is periodically swept.

9. In a photoplotter, the combination defined in claim 8 further characterized by said light conductor being a bundle of optical fibers.

10. In a photoplotter, the combination defined in claim 8 further characterized by said means for directing light which enters said light accepting window onto said photosensitive surface being means for locating said output end surface of said light conductor directly adjacent and close to said photosensitive surface.

11. In a photoplotter, the combination defined in claim 8 further characterized by said means for directing light which enters the light accepting window onto said photosensitive surface comprising a projecting lens located between said output end surface of said light conductor and said photosensitive surface for projecting the outgoing light from said output end surface onto said photosensitive surface.

12. In a photoplotter, the combination defined in claim 1 further characterized by said photoplotter having a main frame relative to which said means for supporting a sheet of photosensitive material is fixed and relative to which said photohead moves to expose lines on said photosensitive surface, said light beam generator including a source of light fixed relative to said frame, and an elongated light conductor extending between said light source and said photohead for conducting light from said light source to said photohead.

13. In a photoplotter, the combination defined in claim 12 further characterized by said light conductor having an input end surface also fixed relative to said frame and which input end surface constitutes said light accepting window across which said beam is swept.

14. In a photoplotter, the combination defined in claim 12 further characterized by said means providing a light accepting window and said means for periodically sweeping said light beam across said light accepting window both being located on and carried by said photohead.

15. In a photoplotter, the combination defined in any one of claim 1 to 14 further characterized by said means for periodically sweeping said beam across said light accepting window being a rotating mirror.

16. In a photoplotter, the combination defined in any one of claims 1 to 14 further characterized by said means for periodically sweeping said beam across said light accepting window being an oscillating mirror.

17. In a photoplotter, the combination defined in claim 16 further characterized by means for varying the character of the oscillation of said mirror in response to the speed of said output beam relative to said photosensitive surface.

18. In a photoplotter, the combination defined in claim 16 further characterized by means for varying the cross-sectional size of said output beam of light, and means for varying the character of the oscillation of said mirror in response to changes in the cross-sectional size of said output beam of light.

19. In a photoplotter, the combination defined in claim 18 wherein the size and shape of said light accepting window defines the cross-sectional size and shape of said output beam of light and further characterized by said means for varying the cross-sectional size of said output light beam being means for varying the cross-sectional size of said light accepting window.

20. In a photoplotter, the combination defined in claim 1 further characterized by means for varying the intensity of said output beam of light in accordance with its speed relative to said photosensitive surface.

21. In a photoplotter, the combination defined in claim 20 further characterized by said means for varying the intensity of said output beam of light being means for varying the intensity of said beam of light prior to its being swept across said light accepting window.

22. In a photoplotter, the combination defined in claim 2 further characterized by said aperture means having a plurality of apertures, and means for moving said aperture means to cause any selected one of its apertures to be used as said light accepting window.

23. In a photoplotter, the combination defined in claim 22 further characterized by said means for directing light which enters said light accepting window onto said photosensitive surface being a projecting lens located between said aperture means and said photosensitive surface for projecting outgoing light from the selected one of said apertures onto said photosensitive surface.

24. In a photoplotter, the combination defined in claim 23 further characterized by a beam rotating means between said aperture means and said projection lens for rotating relative to said photosensitive surface the image of the selected aperture projected onto said photosensitive surface by said projecting lens.

25. In a photoplotter, the combination defined in claim 1 further characterized by means for varying the frequency at which said beam is swept across said light accepting window.

26. In a photoplotter, the combination defined in claim 1 further characterized by means for varying the frequency at which said beam is swept across said light accepting window in response to changes in the speed at which said output beam of light is moved relative to said photosensitive surface.

27. In a photoplotter, the combination defined in claim 1 further characterized by means for varying the size of said light accepting window, and means for varying the frequency at which said light beam is swept across said light accepting window in accordance with changes in the size of said window.

28. In a photoplotter, the combination defined in claim 1 further characterized by said means for sweeping said beam across said light accepting window comprising a mirror, and a piezo-electric driver for oscillating said mirror.

29. In a photoplotter, the combination defined in claim 1 further characterized by means for producing a plurality of light beams one of which is said light beam of claim 1, said means for periodically sweeping said beam across said light accepting window being a single cyclically movable mirror for all of said plurality of light beams, and means conditioning said mirror to sweep any selected one of said plurality of light beams across said window.

30. In a photoplotter, the combination defined in claim 29 further characterized by said means conditioning said mirror to sweep any selected one of said plurality of light beams across said window comprising a means for selectively changing the fundamental position about which said mirror cyclically moves.

31. In a photoplotter, the combination defined in claim 29 further characterized by a base for said mirror, means connecting said mirror to said base for pivotal movement relative to said base above a pivot axis, and means for oscillating said mirror about said pivot axis, said means for selectively changing the fundamental position of said mirror being means for changing the location of said pivot axis relative to said base.

32. In a photoplotter, the combination defined in claim 29, claim 30 or claim 31 further characterized by said plurality of light beams being beams of different color.

33. In a photoplotter, the combination defined in claim 1 further characterized by means for producing a plurality of light beams one of which is said light beam mentioned in claim 1, and a corresponding plurality of means, each associated with a respective one of said beams, for periodically sweeping each of said beams across said light accepting window.

34. In a photoplotter, the combination defined in claim 33 further characterized by each of said plurality of sweep means being a cyclically movable mirror.

35. In a photoplotter, the combination defined in claim 33 or 34 further characterized by selecting means associated with each of said plurality of light beams for selectively conditioning it to be swept across said light accepting window or not to be swept across said light accepting window.

36. In a photoplotter, the combination defined in claim 35 further characterized by said selecting means for each of said beams being a shutter.

37. In a photoplotter, the combination defined in claim 33 further characterized by said beams being of different color.

38. In a photoplotter, the combination defined in claim 33 further characterized by said beams being beams of the same color so that the intensity of said output light beam may be varied, without varying its color, by varying the number of said beams swept across said light accepting window at the same time.

* * * * *

UNITED STATES PATENT AND TRADEMARK OFFICE
CERTIFICATE OF CORRECTION

PATENT NO. : 4,363,539
DATED : December 14, 1982
INVENTOR(S) : HEINZ JOSEPH GERBER It is certified that error appears in the above-identified patent and that said Letters Patent are hereby corrected as shown below:

Column 8, line 66, delete "pl".

Signed and Sealed this

Fifteenth Day of March 1983

[SEAL]

Attest:

Attesting Officer

GERALD J. MOSSINGHOFF

Commissioner of Patents and Trademarks